Feb. 15, 1944.  M. W. HUMPHREYS  2,341,618
APPARATUS FOR INFLATING HOLLOW ARTICLES
Filed June 10, 1942
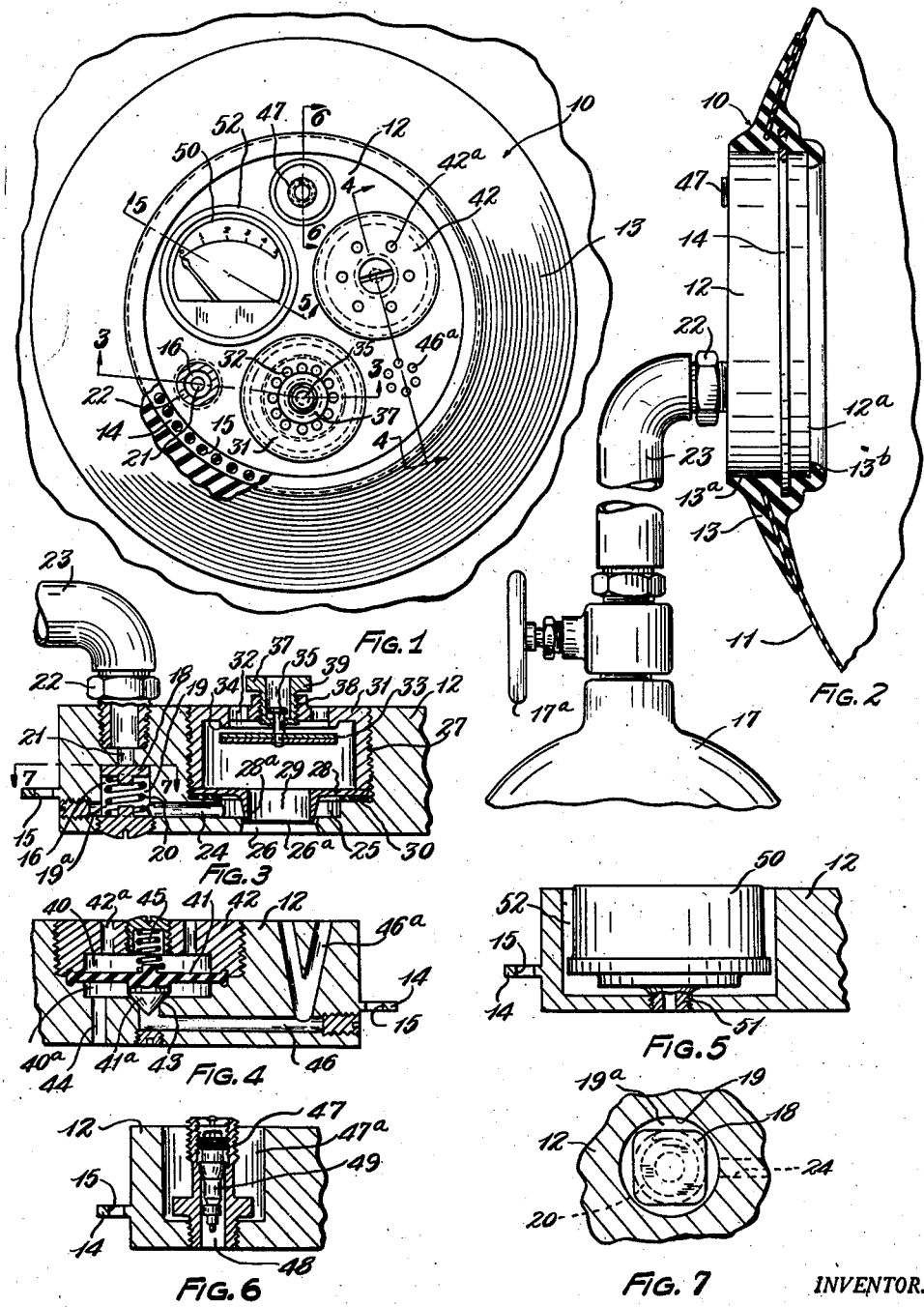
INVENTOR.
BY MARION W. HUMPHREYS
Kuris Hudson & Kent
ATTORNEYS Patented Feb. 15, 1944

2,341,618

UNITED STATES PATENT OFFICE 2,341,618

APPARATUS FOR INFLATING HOLLOW ARTICLES

Marion W. Humphreys, Euclid, Ohio, assignor to The Ohio Rubber Company, Willoughby, Ohio, a corporation of Ohio Application June 10, 1942, Serial No. 446,549

10 Claims. (Cl. 226—20)

This invention relates to the charging or inflating of hollow articles, and more particularly to a novel method and apparatus for charging or inflating rubber boats, life rafts, and various other articles.

An object of my invention is to provide an improved method and apparatus for charging or inflating various hollow articles and involving the discharge of gas into the article and the utilization of the energy of the discharging gas for causing atmospheric air to be simultaneously introduced into the article.

Another object of my invention is to provide for the charging or inflating of hollow articles by discharging gas thereinto with sufficient velocity to cause atmospheric air to be simultaneously drawn into the article.

A further object of my invention is to provide for the inflating or charging of hollow articles in the manner indicated and wherein novel valve means is employed for determining or controlling the pressure desired in the article.

Other objects and advantages of the invention will be apparent from the following description taken in conjunction with the accompanying sheet of drawings, in which Fig. 1 is a plan view showing my inflation unit applied to a hollow article;

Fig. 2 is a view partly in elevation and partly in section illustrating the mounting of my inflation unit in the wall of a hollow article;

Figs. 3 to 6, inclusive, are partial transverse sectional views taken through the inflation unit at different points, as indicated by the corresponding section lines of Fig. 1; and Fig. 7 is a partial sectional view taken through the main inflating valve, as indicated by line 7—7 of Fig. 3.

My method and apparatus for charging or inflating hollow articles provide for the introduction of atmospheric air into the article at the same time that air, carbon dioxide, or other gas under pressure is being discharged into the article. By utilizing the energy or action of the discharging gas for simultaneously introducing atmospheric air into the article, I am able to charge or inflate the article much more quickly and economically than if this operation were carried out with the compressed gas alone. Moreover, with my method a tank of compressed gas will inflate a larger number of articles of a given size than could be served if atmospheric air were not introduced. I also find that the inflow of relatively warm atmospheric air will tend to prevent the formation of ice in the inflation unit due to the rapid expansion of the compressed gas.

In Figs. 1 and 2 I show my inflation unit 10 mounted in an opening of the wall 11 of a hollow article to be charged or inflated, such as a rubber boat or any one of various other hollow articles. My inflation unit comprises, in general, a body or carrier 12 in which the valves and other parts are arranged, and a mounting ring 13 formed of rubber or rubber-like material which surrounds the carrier 12 and is adapted to be cemented, vulcanized, or otherwise connected to the wall 11 of the hollow article. The carrier 12 may be a metal body, preferably round in shape and having a laterally projecting annular flange 14 provided with numerous holes 15. The mounting ring 13 may have a recess or pocket 13a in which the carrier 12 is contained and an annular rim or shoulder 13b overlying the edge portion of the lower or inner face 12a of the carrier. The mounting ring 13 may be connected with the carrier 12 by being bonded or vulcanized thereto, and in addition to this, the lateral flange 14 of the carrier may be embedded in the mounting ring so that some of the material of the latter extends into and through the holes 15 of the flange.

As shown in Figs. 1 to 3, inclusive, I provide the carrier or body 12 with an inflating valve 16 through which the compressed gas may be supplied to the article from a bottle or tank 17 containing a supply of such compressed gas. The inflating valve 16 may comprise a valve disk 18 located in a valve chamber 19 and adapted to be held against its seat by a compression spring 20 for controlling the inlet passage 21 with which the tank 17 is connected by means of the fitting 22 and the conduit 23. The valve chamber 19 may be cylindrical in cross-section and the valve disk 18 may be quadrangular in shape, as shown in Fig. 7, so as to leave spaces 19a for the passage of the gas around the edges of the valve disk.

The compressed gas being supplied to the article from the tank 17 flows from the valve chamber 19 through a passage 24 to an annular chamber 25 from which it is discharged into the hollow article through the nozzle 26. The nozzle has an annular or ring-like orifice 26a which discharges the gas into the article in the form of a hollow stream and with sufficient velocity to simultaneously produce an inflow of atmospheric air into the article. The nozzle 26 may be formed by providing a convergent-divergent opening or Venturi passage in the inner wall or face of the carrier 12 so that when the high velocity stream of gas is discharged therethrough from the orifice 26a, it will produce a desired suction or injector action for drawing or forcing atmospheric air into the hollow article.

The inlet passage for the atmospheric air may be formed by providing the carrier 12 with a threaded recess or counterbore 27 extending from the convergent-divergent nozzle 26 to the opposite or upper face of the carrier. A disk 28 located at or adjacent the inner end of the counterbore 27 may have a tubular portion 28a extending part way into the nozzle 26 and providing a passage or opening 29 for directing the atmospheric air through the nozzle 26 into the hollow article. The tubular portion 28a may be externally tapered and may cooperate with the convergently tapered portion of the nozzle 26 so as to provide therebetween the annular or ring-like orifice 26a leading from the annular chamber 25 into the divergently tapered portion of the nozzle. The disk 28 may be held against a sealing gasket 30 by means of a hollow plug 31 which is screwed into the threaded counterbore 27. The disk is preferably made thin and flexible so that flexing or vibration thereof will occur in response to pressure variations or in response to the rapid delivery of gas through the passage 24 and the orifice 26a. Such flexing is desirable because it tends to prevent the formation or adherence of ice which might clog the orifice.

The hollow plug 31 may be provided with a series of small openings 32 forming a strainer for the atmospheric air which is drawn or forced into the hollow article. This hollow plug also forms a cage for an inwardly opening check valve 33 contained therein. The check valve may comprise a light weight, laminated disk formed of fiber, hard rubber, or other suitable material and adapted to cooperate with an annular seat 34 formed on the hollow plug 31 around the series of air inlet openings 32. The valve 33 may be suspended in the hollow plug 31 by means of a stem or rivet 35 which extends through and is slidable in an opening of the hollow nut 37. This nut is screwed into a threaded opening 38 of the plug 31 and has a knurled portion 39 enabling it to be readily turned manually for causing positive seating or locking of the check valve 33. The nut 37 and the opening 38 are preferably provided with a left-hand thread so that when the nut is turned in a clockwise direction, it will lift the stem 35 to pull the check valve 33 upwardly into engagement with the seat 34, and when the nut is turned in a counter-clockwise direction, it will permit the valve disk 33 to drop away from the seat 34.

When the hollow article is to be charged or inflated, the valve 17a on the tank 17 is opened, permitting the compressed gas to flow inwardly past the check valve 18 and through the passage 24 into the annular chamber 25. From this chamber the compressed gas is discharged through the annular orifice 26a and the Venturi passage or nozzle 26 into the hollow article, thereby producing a suction or injector action which draws in atmospheric air through the openings 32 and past the check valve 33. The incoming atmospheric air passes through the opening 29 of the disk 28 and through the nozzle 26 into the hollow article where it mixes with the gas which has been discharged thereinto from the tank 17. When the charging or inflating operation has continued for a sufficient period of time to cause a desired pressure to build up in the article, such as a gauge pressure of about three pounds per square inch, the inflow of atmospheric air ceases and a flow of gas or gas and air mixture outwardly through the opening 29 and the holes 32 begins to take place. This reversed flow of gas out of the article lifts the check valve 33 and holds the same against the seat 34 to prevent the further discharge of gas from the article.

The flow of gas from the tank 17 into the article through the nozzle 26 continues after the seating of the check valve 33, and to prevent an excessive or dangerous pressure from being built up in the article, I provide a relief valve 40 in the carrier 12. This relief valve may comprise a flexible rubber diaphragm 41 having its outer edge clamped in a recess of the carrier 12 by means of the plug 42 and provided with an integrally formed tapered valve portion or element 41a which is engageable with a valve seat 43. Gas pressure from the hollow article enters the valve chamber 40a beneath the diaphragm 41 through an opening 44. A compression spring 45 normally holds the valve element 41a against its seat, but when the pressure in the article builds up to a predetermined value, which may be on the order of about five pounds per square inch, it lifts the diaphragm 41 to unseat the valve element 41a and permits some of the pressure in the article to be vented to atmosphere through the passage 46 and the branch passages 46a. The space above the diaphragm 41 may be vented to atmosphere through the holes 42a of the plug 42. When the operator observes that the relief valve element 41a has been unseated, as indicated by the discharge of gas to atmosphere from the branch passages 46a, he closes the valve 17a on the tank 17 and at substantially the same time rotates the nut 37 to lock the check valve 33 in engagement with its seat 34.

It may be desirable to charge or inflate the hollow article by means of a pump instead of by compressed gas obtained from the tank 17, and for this purpose the carrier 12 may be provided with a threaded inflating stem 47 to which the hose of an air pump may be connected. The stem 47 has a passage 48 which leads into the hollow article and which is controlled by a valve unit 49 similar to the valve units employed in the inflating stems of pneumatic tires. To shield the stem 47 from damaging blows it may be located in a recess or counterbore 47a.

For checking the pressure in the hollow article during the inflating operation and at other times, the carrier 12 may be provided with a pressure gauge 50 of suitable construction and having a stem 51 which serves to mount the gauge on the carrier and also to connect the gauge with the interior of the hollow article. To afford protection for the gauge and to obtain compactness, the gauge may be located in a suitable recess 52 provided in the carrier 12.

From the foregoing description and the accompanying drawing it will now be readily understood that I have provided a novel method for charging or inflating a hollow article so that the action of the compressed gas being discharged into the article can be utilized to simultaneously introduce atmospheric air into the article. It will likewise be seen that I have also provided a compact and efficient inflation unit for carrying out this method.

While I have illustrated and described my method and apparatus in a more or less detailed manner, it will be understood, of course, that I do not wish to be limited to the particular steps and details herein disclosed, but regard my invention as including such changes and modifications as do not constitute a departure from the spirit of the invention and the scope of the appended claims.

Having thus described my invention, I claim:

1. In apparatus of the character described, a body adapted for connection with a hollow article to be inflated, said body having a passage therein leading from atmosphere into the article, a nozzle around said passage adapted to discharge a stream of gas into said article so as to produce an inflow of atmospheric air through said passage and into the article, and a connection for supplying the gas under pressure to said nozzle.

2. In apparatus for inflating hollow articles, a body adapted for connection with an article to be inflated, said body having a passage therein leading from atmosphere into the article and means arranged to discharge a stream of gas into said article so as to produce an inflow of atmospheric air through said passage and into the article, a connection for supplying the gas under pressure to said discharge means, and an inwardly opening check valve in said passage adapted to be seated to close said passage upon the building up of predetermined pressure in said article.

3. In apparatus for inflating hollow articles, a body adapted for connection with an article to be inflated, said body having a passage therein leading from atmosphere into the article and means arranged to discharge a stream of gas into said article so as to produce an inflow of atmospheric air through said passage and into the article, a connection for supplying the gas under pressure to said discharge means, an inwardly opening check valve in said passage adapted to be seated to close said passage upon the building up of predetermined pressure in said article, and locking means for retaining said check valve seated.

4. In apparatus of the character described, a body adapted for connection with a hollow article to be inflated, said body having a passage therein leading from atmosphere into the article and means arranged to discharge a stream of gas into said article so as to produce an inflow of atmospheric air into the article through said passage, a connection for supplying the gas under pressure to said discharge means, said gas discharge means and passage being such that a flow out of the article will take place through said passage when the pressure in the article reaches a predetermined value, and a check valve in said passage adapted to be seated to close said passage in response to such outflow.

5. In inflating apparatus, a body adapted to be mounted in an opening of the wall of an inflatable article, said body having a passage therein leading from atmosphere into said article, and a hollow part mounted in said body with a portion of said hollow part spaced from the wall of the passage to define a nozzle orifice opening toward the interior of said article, said body also having a passage communicating with the nozzle orifice for supplying gas under pressure thereto.

6. In apparatus of the character described, a body adapted to be mounted in an opening of a hollow article and having a passage therein leading from atmosphere into the article through a venturi, and means for discharging gas under pressure into the article so as to produce an inflow of atmospheric air into the article through said passage and venturi.

7. In apparatus of the character described, a body adapted to be mounted in an opening of a hollow article and having a passage therein leading from atmosphere into the article through a convergent-divergent nozzle, a tapered tubular part extending into said nozzle and defining therewith an annular orifice, and means for discharging gas under pressure through said orifice to induce an inflow of atmospheric air through said tubular part and nozzle.

8. In apparatus of the character described, a body adapted to be mounted in a wall of a hollow article, said body having a recess in communication with atmosphere and an opening connecting the recess with the interior of the article, a disk in said recess having a tubular portion extending into said opening and defining therewith an annular orifice, and means for discharging gas under pressure through said orifice so as to induce a flow of atmospheric air into the article through said tubular portion and opening.

9. In apparatus of the character described, a body adapted to be mounted in a wall of a hollow article, said body having a recess in communication with atmosphere and an opening connecting the recess with the interior of the article, a disk in said recess having a tubular portion extending into said opening and defining therewith an annular orifice, and means for discharging gas under pressure through said orifice so as to induce a flow of atmospheric air into the article through said tubular portion and opening, said disk being flexible in response to pressure variations and vibrations to prevent the adherence of ice.

10. In inflation apparatus, a body having means for delivering gas under pressure into a hollow article to be inflated, said body having a chamber therein and passages connecting said chamber with atmosphere and with the interior of the article, a valve seat surrounding the passage to atmosphere, and a flexible rubber diaphragm spanning said chamber and adapted to be flexed upon the occurrence of a predetermined pressure in the article, said diaphragm having a valve element formed integral therewith and adapted to sealingly engage said seat.

MARION W. HUMPHREYS.